(12) United States Patent
Belitzky

(10) Patent No.: US 11,629,261 B2
(45) Date of Patent: Apr. 18, 2023

(54) SUPPORT INK COMPOSITIONS AND METHODS OF USE THEREOF IN ADDITIVE MANUFACTURING SYSTEMS

(71) Applicant: Nano Dimension Technologies, LTD, Nes Ziona (IL)

(72) Inventor: Alik Belitzky, Rehovot (IL)

(73) Assignee: Nano Dimension Technologies, Ltd., Nes Ziona (IL)

( * ) Notice: Subject to any disclaimer, the term of this patent is extended or adjusted under 35 U.S.C. 154(b) by 0 days.

(21) Appl. No.: 17/620,860

(22) PCT Filed: Jun. 19, 2020

(86) PCT No.: PCT/US2020/038770
§ 371 (c)(1),
(2) Date: Dec. 20, 2021

(87) PCT Pub. No.: WO2020/257669
PCT Pub. Date: Dec. 24, 2020

(65) Prior Publication Data
US 2022/0267624 A1    Aug. 25, 2022

Related U.S. Application Data

(60) Provisional application No. 62/863,299, filed on Jun. 19, 2019.

(51) Int. Cl.
| | | |
|---|---|---|
| *C09D 11/102* | (2014.01) |
| *C08F 2/50* | (2006.01) |
| *C09D 11/101* | (2014.01) |
| *B33Y 10/00* | (2015.01) |
| *B29C 64/112* | (2017.01) |
| *B29C 64/209* | (2017.01) |
| *C09D 11/106* | (2014.01) |
| *C09D 11/38* | (2014.01) |
| *B33Y 30/00* | (2015.01) |
| *B33Y 70/00* | (2020.01) |

(52) U.S. Cl.
CPC .......... *C09D 11/102* (2013.01); *B29C 64/112* (2017.08); *B29C 64/209* (2017.08); *C08F 2/50* (2013.01); *C09D 11/101* (2013.01); *C09D 11/106* (2013.01); *C09D 11/38* (2013.01); *B33Y 10/00* (2014.12); *B33Y 30/00* (2014.12); *B33Y 70/00* (2014.12)

(58) Field of Classification Search
CPC ................ C09D 11/102; C09D 11/101; C09D 11/106; C09D 11/38; B29C 64/112; B29C 64/209; C08F 2/50; B33Y 10/00; B33Y 30/00; B33Y 70/00
See application file for complete search history.

(56) References Cited

U.S. PATENT DOCUMENTS

| | | | |
|---|---|---|---|
| 5,914,174 A * | 6/1999 | Gupta | ...................... C09D 4/00 359/321 |
| 2005/0026069 A1 | 2/2005 | Yeh | |
| 2016/0053124 A1 | 2/2016 | Brandstein et al. | |
| 2018/0203350 A1 | 7/2018 | Hsu et al. | |

FOREIGN PATENT DOCUMENTS

| | | | | |
|---|---|---|---|---|
| WO | 2015152744 A1 | 10/2015 | | |
| WO | 2017145159 A1 | 8/2017 | | |
| WO | WO 2018-140517 | * | 8/2018 | ............. G06F 17/50 |

* cited by examiner

*Primary Examiner* — Jessica M Roswell
(74) *Attorney, Agent, or Firm* — Guy Levi; The IP Law Firm of Guy Levi, LLC

(57) ABSTRACT

The disclosure relates to systems, methods and compositions for fabricating additive manufactured electronics having conductive and dielectric constituents comprising voids, using additive manufacturing. Specifically, the disclosure is directed to the fabrication of three-dimensional component having conductive and dielectric constituents comprising voids by using water soluble support ink, capable of undergoing all processing steps for fabricating the dielectric and conductive constituents.

20 Claims, 1 Drawing Sheet

SUPPORT INK COMPOSITIONS AND METHODS OF USE THEREOF IN ADDITIVE MANUFACTURING SYSTEMS

CROSS REFERENCE TO RELATED APPLICATIONS

This patent application is a U.S. National Phase filing of commonly owned and pending PCT Application No. PCT/US20/38770, filed Jun. 19, 2020, which is based on and claims the benefit of the filing date of U.S. Provisional Patent Application Ser. No. 62/863,299, filed Jun. 19, 2019, both which are incorporated herein by reference in their entirely.

BACKGROUND

The disclosure is directed to systems, methods and compositions for fabricating electronic component comprising the voids using additive manufacturing. Specifically, the disclosure is directed to the fabrication of composite components comprising voids by using water soluble support ink, using for example, inkjet printing.

Over the past few years, additive manufacturing and free-form fabrication processes have experienced some significant advances in terms of fabricating articles directly from computer-controlled media. For example, rapid prototyping techniques allow many articles (e.g., prototype parts and mold dies) to be fabricated more quickly, cost effectively, while maintaining the proprietary knowledge of the articles in-house, than conventional machining processes that require blocks of material to be specifically machined in accordance with engineering drawings and that are usually outsourced.

Additive Manufacturing (AM), similarly to other rapid prototyping techniques, conventionally involves the use of a three dimensional (3D) computer aided design (CAD) of a component/part to be made, from which a stereolithography (STL) or other suitable format file is generated within a CAD package. The file (e.g., STL) can then be processed and in effect virtually sliced along the Z-axis at a thickness matching the thickness of the systems' dispensing capabilities. This creates a series (library) of plan cross-sectioned layer of the article.

Additive manufacturing processes allow for highly complex geometries to be created directly (without tooling) from 3D CAD data, thereby permitting the creation of articles exhibiting high resolution surfaces. While these processes have been useful for detailing various surface properties of produced articles, such processes have struggled to produce complex articles having voids therein, for example for creating pits, empty layers, buried wells (or vias) both in terms of conductive components, and dielectric/resinous components when all are incorporated into the article sought to be fabricated.

Thus, there is a need for compositions, systems and methods enabling efficient and precise fabrication of complex articles of component comprising voids.

SUMMARY

Disclosed, in various exemplary implementations, are methods of forming or fabricating components comprising conductive and resin/dielectric constituents using additive manufacturing, for example inkjet printing, as well as exemplary implementations of support ink compositions facilitating the fabrication of components, or articles comprising voids.

In an exemplary implementation provided herein is a pre-cured support ink composition comprising: at least one of: an acrylate polymer and derivatives thereof, wherein the at least one of acrylate derivatives thereof are each pre-cured; a pre-cured water-soluble copolymer comprising a backbone having aromatic and aliphatic monomers; a surfactant of the pre-cured acrylate oligomers and/or derivatives thereof and the water-soluble copolymer; a photoinitiator (PI), wherein the ratio (w/w) between the water-soluble copolymer and the PI is between 1:1 and 4:1.

In another exemplary implementation, provided herein is a method for fabricating a three dimensional component comprising voids using inkjet printer comprising: providing an ink jet printing system comprising: a first print head, sized and configured to dispense a dielectric resin composition; a second print head sized and configured to dispense a conductive ink composition; a third print head sized and configured to dispense a support ink composition, wherein the support ink composition comprises at least one of: an acrylate polymer and derivatives thereof, wherein the at least one of acrylate derivatives thereof are each pre-cured; a pre-cured copolymer comprising a backbone having aromatic and aliphatic monomers; a surfactant; a photoinitiator (PI), wherein the ratio (w/w) between the copolymer and the PI is between 1:1 and 4:1; a conveyor, operably coupled to the first, the second and the third print heads configured to convey a substrate to each of the first, second, and third print heads; and a computer aided manufacturing ("CAM") module, comprising: at least one processor in communication with a non-transitory storage, storing thereon a set of executable instructions configured, when executed to cause the CPM to: receive a 3D visualization file representing the component having resinous/dielectric, and metallic/conductive constituents with voids therein; and generate a file that represents a first, substantially 2D layer for printing the component comprising the voids, wherein the CAM module is configured to control each of the first, second and third print heads; providing the dielectric resin composition, the conductive ink composition and the support ink composition; using the CAM module, obtaining the first, substantially 2D layer of the component comprising the voids for printing, the 2D layer comprising: a pattern representative of the dielectric resin ink; a pattern representative of the conductive ink; and a pattern representative of the support ink composition; using the first print head, forming the pattern corresponding to the dielectric resin; curing the pattern corresponding to the resin representation in the 2D layer of the component having resinous/dielectric, and metallic/conductive constituents with voids therein; using the second print head, forming the pattern corresponding to the conductive ink representation; sintering the pattern corresponding to the conductive ink; removing the substrate, thereby fabricating a first layer of the component comprising the voids, wherein, before, or subsequent to at least one of the step of forming and curing the pattern corresponding to the dielectric resin representation in the first, substantially 2D layer of the component comprising the voids, and the step of forming and sintering pattern corresponding to the conductive ink representation in the first, substantially 2D layer of the component comprising the voids, using the third print head, forming the pattern corresponding to the support ink representation; and curing the pattern corresponding to the support ink composition in the first 2D layer of the component comprising the voids.

These and other features of the methods and compositions for fabricating components and/or articles having resinous/dielectric, and/or conductive constituents with voids therein, will become apparent from the following detailed description when read in conjunction with the figures and examples, which are exemplary, not limiting.

BRIEF DESCRIPTION OF THE FIGURES

For a better understanding of the systems, fabrication methods and compositions of the components and/or articles having resinous/dielectric, and/or conductive constituents with voids, with regard to the exemplary implementations thereof, reference is made to the accompanying examples and figures, in which.

DETAILED DESCRIPTION

Figure 1A:
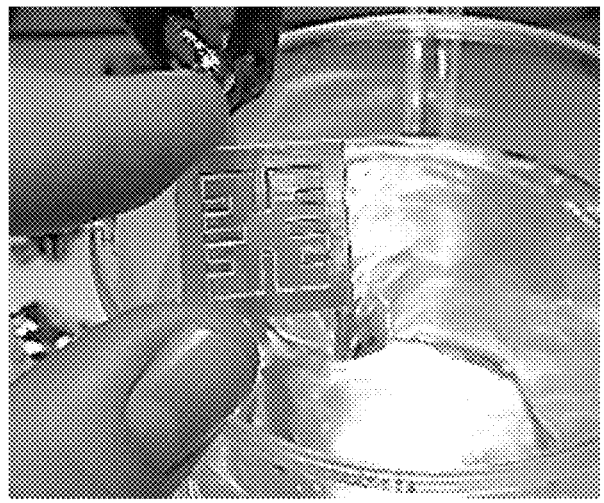
FIG. 1A, 1B Illustrates an articles having dielectric constituents, with voids, before and after solubilizing the support ink composition disclosed herein.

Provided herein are exemplary implementations of systems, methods, and compositions for fabricating components and/or articles having resinous/dielectric, and/or conductive constituents with voids.

The methods described herein can be used to form the components and/or articles having resinous/dielectric, and/or conductive constituents with voids (referring to space created from the removal or displacement of material), in a continuous additive manufacturing process using for example, inkjet printing device, in a single pass, or using several passes. Since, some additive manufacturing methods enable the printing of components and/or articles with both resinous/dielectric, as well as conductive/metal constituents, there is a need for support ink that can withstand the unique requirements of the process. For example, the support ink is adapted to be liquid at relatively low temperatures to allow for jetting process to occur (in other words, having a Weber No. between 0.1, and 1.0.

In addition, the support ink composition is composed such that it will undergo a rapid curing process following the jetting process. Furthermore, the melting point of the support ink composition is adapted to be high enough following the curing process, to allow sintering of the metallic/conductive nano-particles suspended in the conductive ink. Because of the relatively high melting temperature of the support ink (e.g., between about 180° C. and about 240° C.), suitable removal method of the support ink composition to form the desired voids, should be by dissolution. This constraint means the chemical composition of the support ink should differ from the dielectric/resinous constituents in a way that will allow a selective dissolution of the support ink without affecting the resinous/dielectric ink. The support ink compositions disclosed and claimed herein allow relatively rapid removal upon immersing the completed components and/or articles having resinous/dielectric, and/or conductive constituents with voids in deuterium-depleted water ("light water", or DDW). Removal of the support ink is further adapted not to affect the dielectric properties of the dielectric constituents and the electrical properties of the conductive constituents.

Accordingly and in an exemplary implementation, provided herein is a pre-cured support ink composition comprising: at least one of: an acrylate polymer and derivatives thereof, wherein the at least one of acrylate derivatives thereof are each pre-cured; a pre-cured water-soluble copolymer comprising a backbone having aromatic and aliphatic monomers; a surfactant adapted to inhibit cross-linking of the pre-cured acrylate oligomers and/or derivatives thereof and the water-soluble copolymer; a photoinitiator (PI), wherein the ratio (w/w) between the water-soluble copolymer and the PI is between 1:1 and 4:1.

The term "support" as used herein refers to one or more layers of a support material used to provide structural support to the plurality of layers of built components and/or articles having resinous/dielectric, and/or conductive constituents with voids, during the fabrication of the articles and components described herein. Furthermore, the term "pre-cured" in the context of a pre-cured acrylate polymers, and/or the water-soluble copolymer, indicates that at least one matrix material (e.g., a polymer matrix of the support ink, is at least partially cured. For example, in a pre-cured acrylate polymers, and/or the water-soluble copolymer is at least partially cured. Additionally, "at least partially cured" may include substantially fully cured. Accordingly, in the context of the disclosure, term "partially cured" means the degree of cure in pre-cured acrylate polymers, and/or the water-soluble copolymer exposed to a temperature of between about 60° C. and about 180° C., for between about 30 min. and about 180 min. In an exemplary implementation, pre-cured acrylate polymers, and/or the water-soluble copolymer are obtained by subjecting a mixture of un-cured acrylate polymers, and/or the un-cured water-soluble copolymer to curing conditions while mixing the mixture to bring about the desired partial cure degree.

In terms of processing of the pre-cured components, depending on the application for the support ink, variables changed during processing can be at least one of:

Acrylate polymer/oligomer type;
Acrylate polymer/oligomer number average molecular weight ($\overline{M_N}$), and weight average molecular weight ($\overline{M_W}$);
Polydispersity index (PDI) of Acrylate polymer/oligomer;
Acrylate polymer/oligomer degree of branching, branch length and critical segment length;
Water soluble polymer/oligomer type (e.g., ratio between aromatic and aliphatic components);
Water soluble polymer/oligomer number average molecular weight (($\overline{M_N}$)) and weight average molecular weight ($\overline{M_W}$);
PDI of Water soluble polymer/oligomer;
Water soluble polymer/oligomer degree of branching, branch length and critical segment length;
ratio between Acrylate polymer/oligomer and Water soluble polymer/oligomer
photoinitiator (PI) type and concentration;
actinic radiation intensity (lumens) and wavelength (e.g., 190 nm-360 nm);
Exposure time;
temperature;
solvents' type and concentration; and
surfactants' type and concentration (e.g., surfactants preventing crosslinking).

In certain implementation, monitoring curing following the variation of at least one of the parameters disclosed above can be done by, for example:

monitoring the glass transition temperature ($T_g$) of the mixture in comparison to the fully cured dielectric material (e.g., using DSC);
monitoring changes in interstitial free volume (e.g., using DMA, dilatometer, DSC)
monitoring dissolution time and conditions (e.g., time-temperature dissolution tables); and monitoring crosslink density ($v_e$) of the pre-cured polymer/oligomer (e.g., using TGA);

In certain exemplary implementation, the concentration of diacrylate polymer/oligomer (bifunctional) in the mixture, is between 50% and 75%, with $T_g$ being between about 45° C. and about 70° C., and crosslink density ($v_e$) of between about $5.5 \times 10^3$ mol·m$^{-3}$, and about $17 \times 10^3$ mol·m$^{-3}$.

In an exemplary implementation, the support ink compositions used in the methods and systems for fabricating component having resinous/dielectric, and metallic/conductive constituents with voids therein, described herein can be transparent to actinic radiation to accommodate "backflash" exposure through the support. In an exemplary implementation, "actinic radiation" refers to an energy beam capable of curing a resin ink composition for stereolithography such as ultraviolet ray, electron beam, X-ray or radial ray. Accordingly, the term "actinic radiation-curable resin/dielectric, or support compositions" used in producing the components and/or articles having resinous/dielectric, and/or conductive constituents with voids described herein, can be a resin composition which is cured upon irradiation with one or more actinic radiations (energy beams) as described above.

Such a back exposure results in curing at least a part of the photopolymerizable resin ink composition in the layers nearest to the support. Examples of suitable support ink compositions can comprise, for example, between about 50% (w/w) and 90% (w/w) of the pre-cured at least one of acrylate oligomer and derivatives thereof; between about 10% (w/w) and 20% (w/w) of the water soluble copolymer; between about 5% (w/w) and 10% (w/w) of the PI; and no more than 1% (w/w) of the surfactant, wherein the surfactant does not activate cross linking.

For example, the water-soluble copolymer used in the support ink compositions disclosed herein, comprising the backbone having aromatic and aliphatic monomers, can have a weight average molecular weight ($\overline{M_W}$), of between about 5,000 and about 15,000, for example, between about 6,000 and about 12,000, or between about 7,000 and about 10,000. The water-soluble copolymer can be, for example, at least one of: poly(vinylpyrrolidone) (PVP), N-vinyl-2-pyrrolidone (VP), poly(ethyleneglycol) (PEG), and poly(vinylalcohol) (PVA). In an exemplary implementation, the pre-cured support ink composition comprises a combination of two or more copolymers, for example, PVP and PV, or, in another example, PVA and PV and PVP.

Likewise, the pre-cured acrylate polymer backbone used in the support ink compositions disclosed herein, has in an exemplary implementation, weight average molecular weight ($\overline{M_W}$), of between about 1,000 and about 20,000, for example, between about 4,000 and about 16,000, or between about 8,000 and about 12,000. Furthermore, the acrylate polymer is composed of polymerized monomeric units that are at least one of: an ethylenically unsaturated monocarboxylic acid containing from 3 to 12 carbon atoms per molecule, an ethylenically unsaturated dicarboxylic acid containing from 4 to 12 carbon atoms per molecule, the ammonium salts of the monocarboxylic acid and the dicarboxylic acid, the anhydrides of the cis dicarboxylic acids, and a copolymer thereof. Accordingly and in an exemplary implementation, the acrylate polymer's monomeric unit is at least one of: ethyl acrylate, 2-ethylhexyl-acrylate, butyl-acrylate, acryloyl-morpholine (ACMO) and copolymers thereof. In another exemplary implementation, the support ink compositions disclosed herein, comprise a polymer combination and/or a copolymer having two or more monomeric units, for example, two polymers or copolymer comprising ACMO and 2-ethylhexyl-acrylate, or, in another example, 2-ethylhexyl-acrylate, ACMO, and butyl-acrylate.

The choice of water-soluble copolymer, and/or acrylate polymer and their derivative is a function of, for example, at least one of:
  dielectric (DI)/resinous ink composition;
  mechanical requirements of the DI/resinous ink and article;
  Sintering temperature of metallic/conductive constituent;
  curing type and conditions
  void size and location within the article;
  Polymer unit spread length relative to nozzle size in nozzle array*

In other words, polymer length is calculated by dividing the polymer's weight average molecular weight by backbone monomer's molecular weight and multiply the number of units by the characteristic unit length calculated from the average bond length, providing theoretical length of a polymer in its' spread formation. Since polymers have tendency to undergo coagulation, it is beneficial not to have a characteristic spread length that is larger than the nozzle orifice diameter.

Likewise, to optimize the performance based on the above identified requirements, the composition can be adjusted by, for example, at least one of:
  changing the weight average molecular weight of either the water soluble copolymer or the acrylate polymer and/or its derivative, wherein higher molecular weight yields increased mechanical strength, higher composition viscosity and slower dissolution;
  changing the monomeric unit forming either the water soluble copolymer or the acrylate polymer and/or its derivative;
  changing the degree of pre-curing of either the water soluble copolymer or the acrylate polymer and its derivative, wherein higher degree of pre-curing increases mechanical strength and increases dissolution time;
  changing the relative components' concentration;
  increasing/decreasing the concentration of the PI in the support ink composition, wherein higher PI concentration increases mechanical strength and dissolution time.

Photoinitiators that can be used with the pre-cured acrylates described herein can be, for example radical photoinitiators. These radical photoinitiators can be, for example Irgacure® 500 from CIBA SPECIALTY CHEMICAL and Darocur® 1173, Irgacure® 819, Irgacure® 184, TPO-L (ethyl(2,4,6, trimethyl benzoil) phenyl phosphinate) benzophenone and acetophenone compounds and the like. For example, the radical photoinitiator can be cationic photoinitiator, such as mixed triarylsulfonium hexafluoroantimonate salts. Another example of the free radical photoinitiator used, is at least one of: be 2-ispropylthioxanthone (ITX), 2,4-Diethylthioxanthone (DETX), benzophenone, 4-methylbenzophenone, ethyl-4-dimethylaminobenzoate (EDAB), and 2,2-Dimethoxy-2-phenylacetophenone. In an exemplary implementation, two or more PI's are used, for example, ITX and EDAB, or in another example, EDAB, ITX and DETX.

Furthermore, the methods of forming the component having resinous/dielectric, and metallic/conductive constituents with voids therein is described herein can further comprise a step of providing a peelable, or removable substrate, prior to the step of using the first print head, and/or the second print head. The term "peelable" refers in an exemplary implementation to materials that can be removably applied to and adhere to surfaces such as the surface created by the method, compositions and kits for forming component having resinous/dielectric, and metallic/conductive constituents with voids therein s described herein and can be subsequently removed from that surface by force. Peelable films according to the compositions and methods of this invention can be adhesively and removably applied to a chuck disposed on the printer's conveyor belt and, by virtue of being forcibly removed, expose a layer of the component having resinous/dielectric, and metallic/conductive constituents with voids therein.

The removable substrate can also be a powder, for example, a ceramic powder, which can be applied to the chuck, compacted and later removed. The choice of substrate can depend, for example on the final component having resinous/dielectric, and metallic/conductive constituents with voids therein s' use and structure. Furthermore, the removal of the substrate can take place at the end of the fabrication of the whole component, the fabrication of the first 2D layer, or at any stage in between.

The method of forming the component having resinous/dielectric, and metallic/conductive constituents with voids therein can, as described above, comprise the step of providing a substrate (e.g., a peelable film). The print head (and derivatives thereof; are to be understood to refer to any device or technique that deposits, transfers or creates material on a surface in a controlled manner) depositing the resin and/or conductive ink can be configured to provide the ink droplet(s) upon demand, in other words, as a function of various preselected process parameters such as conveyor speed, desired conductive layer thickness, layer type, layer color and the like. The removable or peelable substrate can also be a relatively rigid material, for example, glass or crystal (e.g., sapphire). Additionally, or alternatively, the peelable substrate may be a flexible (e.g., rollable) substrate (or film) to allow for an easy peeling of the substrate from the component having resinous/dielectric, and metallic/conductive constituents with voids therein s, for example, poly(ethylenenaphthalate) (PEN), polyimide (e.g. KAPTONE® by DuPont), silicon polymers, poly(ethyleneterphtalate) (PET), poly(tetrafluoroethylene) (PTFE) films etc. Moreover, the substrate can be, for example a ceramic powder.

In fabricating or forming the composite articles and components described herein, by depositing substantially 2D layers of a component resin and/or metal materials, supporting layers or structures can be deposited as part of the substantial 2D representation of the composite articles and components described herein. This support can be removable and be positioned underneath subsequently printed overhanging portions or in prospective cavities, which are not supported by the part or component material itself. A support structure may be built utilizing the same deposition techniques by which the part material is deposited. In an exemplary implementation, the CAM module can generate additional geometry acting as a support structure for the overhanging or free-space segments of the 3D visualization file representing the component having resinous/dielectric, and metallic/conductive constituents with voids therein being formed, and in other circumstances, for the sidewalls of the composite articles and components being formed. The support material can be configured to, for example, adhere to the part material during fabrication, and be removable from the completed composite articles and components described herein when the printing process is completed.

Suitable surfactants to be used in the support ink compositions disclosed herein are, for example, anionic surfactants, such as from $C_8$ to $C_{12}$ alkylbenzene sulfonates, from $C_{12}$ to $C_{16}$ alkanesulfonates, from $C_{12}$ to $C_{16}$ alkyl sulfates, from $C_{12}$ to $C_{16}$ alkyl sulfosuccinates and from $C_{12}$ to $C_{16}$ sulfated ethoxylated alkanols and nonionic surfactants such as from $C_6$ to $C_{12}$ alkylphenol ethoxylates, from $C_{12}$ to $C_{20}$ alkanol alkoxylates, and block copolymers of ethylene oxide and propylene oxide. Likewise, silicone polymers can be modified by grafting polyether groups to give silicone-polyether copolymers. These copolymers behave as surfactants in aqueous media as they have both hydrophobic and hydrophilic components. Accordingly and in an exemplary implementation, the surfactant can be, for example polyether-modified poly(dimethyl siloxane) (PDMS).

In an exemplary implementation, the support ink compositions described herein, are used in the systems and methods provided. Accordingly and in an exemplary implementation, provided herein is a method for fabricating a three dimensional component comprising voids using inkjet printer comprising: providing an ink jet printing system comprising: a first print head, operable to dispense a dielectric resin composition; a second print head operable to dispense a conductive ink composition; a third print head operable to dispense a support ink composition, wherein the support ink composition comprises at least one of: an acrylate polymer and derivatives thereof (referring for example to the variability between unprotected terminal end, branch length and frequency etc.), wherein the at least one of acrylate derivatives thereof are each pre-cured; a pre-cured water-soluble copolymer comprising a backbone having aromatic and aliphatic monomers; a surfactant adapted to inhibit cross-linking of the pre-cured acrylate oligomers and/or derivatives thereof and the water-soluble copolymer; a photoinitiator (PI), wherein the ratio (w/w) between the water-soluble copolymer and the PI is between 1:1 and 4:1; a conveyor, operably coupled to the first, the second and the third print heads configured to convey a substrate to each of the first, second, and third print heads; and a computer aided manufacturing ("CAM") module, in communication with each of the first, second and third print heads, the CAM module including a central processing module (CPM), wherein the CPM further comprising: at least one processor in communication with a non-transitory storage device, configured to store instructions that, when executed by the at least one processor cause the CAM to control the ink-jet printing system, by carrying out steps that comprise: receiving a 3D visualization file representing the AME circuit comprising the composite component; and generating a file library having a plurality of files, each file representing a substantially 2D layer for printing the AME circuit comprising the composite component, containing on the same file, a support ink pattern, a conductive ink pattern and a dielectric ink pattern, wherein the CAM module is configured to control each of the first, second and third print heads; providing the dielectric resin composition, the conductive ink composition and the support ink composition; using the CAM module, obtaining from the library the first layer file of the component comprising the voids for printing, the first layer comprising: a pattern representative of the dielectric resin ink; a pattern representative of the conductive ink; and a pattern representative of the support ink composition; using the first print head, forming the pattern corresponding to the dielectric resin on the substrate; using actinic radiation, curing the pattern corresponding to the dielectric resin; using the second print head, forming the pattern corresponding to the conductive ink on either the substrate, or the dielectric resin pattern; independently, before or after the step of curing and using heat, sintering the pattern corresponding to the conductive ink; removing the substrate, thereby fabricating a first layer of the component comprising the voids, wherein, before, or subsequent to at least one of the step of: forming and curing the pattern corresponding to the dielectric resin representation in the first layer of the component comprising the voids, and the step of forming and sintering pattern corresponding to the conductive ink representation in the first layer of the component comprising the voids, using the third print head, forming the pattern corresponding to the support ink; simultaneously, before or after the step of curing the dielectric resin pattern, and/or the step of sintering the conductive ink pattern, using actinic radiation, curing the support ink pattern.

Moreover, the set of executable instruction is further configured, when executed to cause the CPM to generate a library of substantially 2D layers for subsequent printing the component comprising the voids, each layer comprising a pattern representative of at least one of the dielectric resin, the conductive ink, and the support ink composition in the subsequent, substantially 2D layer of the component comprising the voids as well as their printing order, and further, using the CAM module, obtaining a generated file representing a subsequent layer of the component comprising the voids for printing; and repeating the steps for forming a subsequent layer to the completion of printing the component comprising the voids.

Furthermore, in the context of the disclosure, the term "operable" means the system and/or the device and/or the program, or a certain element or step is/are fully functional sized, adapted and calibrated, comprises elements for, and meets applicable operability requirements to perform a recited function when activated regardless of being powered or not, coupled, implemented, effected, realized or when an executable program is executed by at least one processor associated with the system and/or the device. In relation to systems and AME circuits, the term "operable" means the system and/or the circuit is fully functional and calibrated, comprises logic for, and meets applicable operability requirements to perform a recited function when executed by at least one processor.

Thus, upon the completion of the printing of the whole article (in other words, printing of the files in the library according to their order, which is derived from the 3D file representing the additive manufactured electronic (AME) component), the method further comprises immersing the component comprising the voids in water, for example, water, (in other words double-distilled water (DDW), or deuterium-depleted water); and dissolving the support ink, wherein the water temperature in the step of dissolving the support is between about 24° and about 70° C. for about between 15 minutes and 120 minutes, thereby forming voids where the support ink patterns were deposited.

In an exemplary implementation, the printing system used in the methods and systems for fabricating component having resinous/dielectric, and metallic/conductive constituents with voids therein can further comprise yet an additional functional print heads configured to dispense a second support ink composition that is different than the initial support ink composition used. Using the additional support ink head, the method can further comprise providing an additional support ink composition; either subsequent, sequentially or simultaneously to the step of using the first print head, the second print head, or any other functional print head (and any permutation thereof), using the additional support ink print head, forming a predetermined pattern corresponding to the additional support representation generated by the CAM module from the 3D visualization file and represented as a pattern in the, substantially 2D layer of the component having resinous/dielectric, and metallic/conductive constituents with voids therein for printing.

The predetermined pattern corresponding to either the first or additional support ink compositions' pattern representation(s) can then be further treated (e.g., cured, cooled, crosslinked and the like), to functionalize the pattern as support as described hereinabove. The process of depositing the support ink composition(s) can be repeated thereafter for every sequential layer as needed.

The term "forming" (and its variants "formed", etc.) refers in an exemplary implementation to pumping, injecting, pouring, releasing, displacing, spotting, circulating, or otherwise placing a fluid or material (e.g., the conductive ink) in contact with another material (e.g., the substrate, the resin or another layer) using any suitable manner known in the art.

Likewise, other functional "heads" may be located before, between or after the dielectric/resinous print head and/or the conductive (metal containing) print head. These may include a source of electromagnetic (e.g., actinic) radiation configured to emit electromagnetic radiation at a predetermined wavelength ($\lambda$), for example, between 190 nm and about 400 nm, e.g. 365 nm which in an exemplary implementation, can be used to accelerate and/or modulate and/or facilitate a photopolymerizable resin curing that can be used on conjunction with metal nanoparticles dispersion used in the conductive ink. Other functional heads can be heating elements including infrared lamps for example, additional printing heads with various inks (e.g., pre-soldering connective ink, label printing of various components for example capacitors, transistors and the like) and a combination of the foregoing.

In the context of the disclosure, the term "sintering" denotes a process of compacting and forming a solid mass of material by heat and/or pressure without melting it to the point of liquefaction. A driving force for densification is the change in free energy from the decrease in surface area of nanoparticles suspended in the conductive ink and lowering of the surface free energy. Sintering may form modified but lower-energy solid-solid cohesive interfaces with a total decrease in solid/liquid, and/or solid/solid, and/or solid/air free energy. Furthermore, sintering and curing are carried out in certain implementations, using independent stages and not within the same space of the printing system. It is further noted that the concentration of the metal nanoparticles within the sintered conductive ink is configured to exceed the three dimensional site percolation threshold.

As indicated, the systems used to implement the methods for fabricating component having resinous/dielectric, and metallic/conductive constituents with voids therein, can have conductive ink print head, which ink may contain different metals. For example, the conductive ink composition(s) used in the systems, and methods disclosed can comprise, for example: a Silver (Ag) nanoparticles while conductive ink(s) may comprise different metal, e.g., Copper or Gold. Likewise, other metals (e.g., Al) or metal precursors can also be used and the examples provided should not be considered as limiting.

Other similar functional steps (and therefore means for affecting these steps) may be taken before or after each of the DI/resinous ink composition deposit and curing, and/or conductive ink deposit and sintering, and/or support ink composition deposit and curing. These steps may include (but not limited to): a heating step (affected by a heating element, or hot air); photocuring, or exposure to any other appropriate actininc radiation source (using e.g., a UV light source); drying (e.g., using vacuum region, and heating element); (reactive) plasma deposition (e.g., using pressurized plasma gun and a plasma beam controller); cross linking such as {4-[(2-hydroxy tetradecyl)-oxyl]-phenyl}-phenyl iodonium hexafluoro antimonate to the DI/resin polymer solutions prior to coating or used as dispersant with the metal precursor or nanoparticles); annealing, or facilitating redox reactions.

In certain exemplary implementation, a laser (for example, selective laser sintering/melting, direct laser sintering/melting), or electron-beam melting can be used on either the resin or the conductive portion. It should be noted, that sintering of the conductive constituents can take place even under circumstances whereby the conductive portions are printed on top of a DI/resinous/support portions of article. It should be noted, that conductive layers can be deposited among the resin layers, separately and distinct from a coating pattern above the resin layer. For example, a conductive layer can be deposited over a support layer, which following removal, will be independent of any resin material.

Accordingly, in an exemplary implementation, the steps depositing the conductive inkjet ink onto the substrate, thereby forming a first printed conductive pattern layer and/or the step of depositing the DI/resinous ink onto the removable substrate, and/or or removable support, is preceded, followed or takes place concurrently with a step of heating, photocuring drying, depositing plasma, cross linking, annealing, facilitating redox reactions, sintering, melting or a combination of steps comprising one or more of the foregoing.

In an exemplary implementation, formulating the conductive ink and/or DI/resinous ink composition, and/or support ink composition, take into account the requirements, if any, imposed by the deposition tool (e.g., the print head(s)—in terms of viscosity and surface tension of the composition) and the deposition surface characteristics (e.g., hydrophilic or hydrophobic, and the interfacial energy of the peelable or removable substrate or the support material used). Using for example, ink-jet printing with a piezo head, the viscosity of the conductive ink and/or the DI/resinous ink, and the support ink composition (measured between 40° C. and 55° C.) can be, for example, not lower than about 5 cP, e.g., not lower than about 8 cP, or not lower than about 10 cP, and not higher than about 30 cP, e.g., not higher than about 20 cP, or not higher than about 15 cP. Likewise, the conductive ink and/or DI/resinous ink composition, and/or support ink composition, can be adapted to have a dynamic surface tension (referring to a surface tension when an ink droplet is formed at the print-head nozzle array's apperture) of between about 25 mN/m and about 35 mN/m, for example between about 29 mN/m and about 31 mN/m measured by maximum bubble pressure tensiometry at a surface age of 50 ms and at 25° C. The dynamic surface tension can be formulated to provide a contact angle with the peelable substrate, the support material, the resin layer(s), or their combination, that is lower than 85°.

In an exemplary implementation, conductive portion patterns formed using silver are printed using inks of nano-silver suspensions. The conductive portion of the 2D representation of the 3D component having resinous/dielectric, and metallic/conductive constituents with voids, as well as the support ink herein can be significantly enhanced in quality during sintering by, for example, the silver nanoparticles having thin or small features with high aspect ratios. In other words, by having conductive nanoparticles with aspect ratio R that is much higher than 1 (R>>1). Having the high aspect ratio can create an alignment of the nanoparticles due to, for example, flow orientation of the ink in the direction of motion of the substrate on a chuck, or in another exemplary implementation, by the ejection process from the print head's orifice and the progression of the substrate.

In an exemplary implementation, the term "chuck" is intended to mean a mechanism for supporting, holding, or retaining a substrate or a workpiece. The chuck may include one or more pieces. In one exemplary implementation, the chuck may include a combination of a stage and an insert, a platform, be jacketed or otherwise be configured for heating and/or cooling and have another similar component, or any combination thereof.

In an exemplary implementation, the ink-jet ink compositions and methods allowing for a continuous or semi-continuous ink-jet printing of a 3D component having resinous/dielectric, and metallic/conductive constituents with voids therein can be patterned by expelling droplets of the liquid ink provided herein from an orifice one-at-a-time, as the print-head (or the substrate) is maneuvered, for example in two (X-Y) (it should be understood that the print head can also move in the Z axis) dimensions at a predetermined distance above the removable substrate or any subsequent layer. The height of the print head can be changed with the number of layers, maintaining for example a fixed distance. Each droplet can be configured to take a predetermined trajectory to the substrate on command by, for example a pressure impulse, via a deformable piezo-crystal in an exemplary implementation, from within a well operably coupled to the orifice. The printing of the first inkjet conductive ink can be additive and can accommodate a greater number of layers. The ink-jet print heads provided used in the methods described herein can provide a minimum layer film thickness equal to or less than about 3 μm-10,000 μm The conveyor maneuvering among the various print heads used in the methods described and implementable in the systems described, can be configured to move at a velocity of between about 5 mm/sec and about 1000 mm/sec. The velocity of the e.g., the chuck can depend, for example, on: the desired throughput, the number of print heads used in the process, the number and thickness of layers of the component having resinous/dielectric, and metallic/conductive constituents with voids printed, the curing time of the DI/resinous ink and/or support ink compositions, the evaporation rate of the ink solvents, the distance between the print head(s) dispensing the conductive ink and/or DI/resinous ink composition, and/or support ink composition, and the like or a combination of factors comprising one or more of the foregoing.

In an exemplary implementation, the volume of each droplet of the conductive ink and/or DI/resinous ink composition, and/or support ink composition, can each range from 0.5 to 300 picoLiter (pL), for example 1-4 pL and depended on the strength of the driving pulse and the properties of the ink. The waveform to expel a single droplet can be a 10V to about 70 V pulse, or about 16V to about 20V, and can be expelled at frequencies between about 0.1 kHz and about 18 kHz.

The DI/resinous ink can be adapted to be stable within a print head reservoir. For example, the solid contents (i.e., suspended solids if colloidal suspension, or solute if a solution) can be between about 5 and about 100 wt %. Likewise, the suspended ink solids in other words, latex inks, can be uniformly dispersed in the solvent by additional suitable surfactant. Conversely, suitable surfactants may not be necessary and the ink can be 100% active, by incorporating photoactive monomers/oligomers and their combination of multifunctional acrylates, in which no appreciable sedimentation can take place.

In an exemplary implementation, the DI/resinous—forming ink used in the methods implementable in the systems described herein, can be a suspension, emulsion, or solution composition comprising: a monomer, oligomer, or a combination comprising the foregoing.

Initiating the resin backbone can be done using an initiator, for example benzoyl peroxide (BP) and other peroxide-containing compounds. The term "initiator" as used herein generally refers to a substance that initiates a chemical reaction, specifically any compound which initiates polymerization, or produces a reactive species which initiates polymerization, including, for example and without limitation, co-initiators and/or photoinitiator(s).

The terms "live monomer", "live oligomer", "live polymer" or their counterparts (co-monomer e.g.) combination refers in an exemplary implementation to a monomer, a short group of monomers or a polymer having at least one functional group capable of forming a radical reaction (in other words, the reaction can be continued and is not otherwise terminated by an end-group). The amount of live monomer, live oligomer, or their combination the porous particulates are impregnated with will change with the desired physic-chemical characteristic of the board, film or sheet sought to be formed. The live monomer, live oligomer or a combination thereof has a number average molecular weight ($\overline{MW}_n$), in other words the average number of monomers per chain of between 1 and about 2000, for example, $\overline{MW}_n$ between 1 and about 1000 or $\overline{MW}_n$ of between about 250 and about 750, specifically between about 300 and about 500.

In an exemplary implementation, the cross-linking agent, co-monomer, co-oligomer, co-polymer or a composition comprising one or more of the foregoing and is used in the resin ink(s) provided, can be a part, or configured to form a solution, emulsion, or suspension within the resin ink compositions.

In another exemplary implementation, the DI/resinous ink composition comprises active components of a polymer capable of undergoing photoinitiation using the photoinitiators provided herein. Such live monomer, live oligomer, live polymer or their combination can be for example, multi-functional acrylates, can be for example, at least one of: 1,2-ethanediol diacrylate, 1,3-propanediol diacrylate, 1,4-butanediol diacrylate, 1,6-hexanediol diacrylate, dipropylene glycol diacrylate, neopentyl glycol diacrylate, ethoxylated neopentyl glycol diacrylate, propoxylated neopentyl glycol diacrylate, tripropylene glycol diacrylate, bisphenol-A-diglycidyl ether diacrylate, hydroxypivalic acid neopentanediol diacrylate, ethoxylated bisphenol-A-diglycidyl ether diacrylate, polyethylene glycol diacrylate, trimethylolpropane triacrylate, ethoxylated trimethylolpropane triacrylate, propoxylated trimethylolpropane triacrylate, propoxylated glycerol triacrylate, tris(2-acryloyloxyethyl) isocyanurate, pentaerythritol triacrylate, ethoxylated pentaerythritol triacrylate, pentaerythritol tetraacrylate, ethoxylated pentaerythritol tetraacrylate, ditrimethylolpropane tetraacrylate, dipentaerythritol pentaacrylate and dipentaerythritol hexaacrylate.

The printed pattern of the DI/resinous ink portion can be fabricated from resin-rich ink compositions, for example, suspensions, emulsions, solutions and the like. The term "resin-rich" refers to compositions in which larger proportions of polymer resin components are included than are needed to bind the DI/resinous ink layer to the underlying substrate, conductive layer, or to a layer of another component having resinous/dielectric, and metallic/conductive constituents with voids therein, or support portion and their combination. For example, a resin-rich component layer may include polymer DI/resins in amounts that are at least 95% by weight of the total DI/resin ink weight.

In an exemplary implementation, parameters used in selection of parameters related to the component having resinous/dielectric, and metallic/conductive constituents with voids therein performed by the CAM module used for the fabrication, can be, for example: the desired printing throughput, the resin pattern in the layer, the conductive pattern in the layer, the desired resin layer color, the coloring order of the resin pattern, curing requirements for the DI/resin and/or sintering requirement of the conductive/metallic ink composition pattern in the layer, the need and location of (removable) support layers, or a combination of parameters comprising one or more of the foregoing.

The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple (remote) locations. Further, the term "module" is used herein to refer to software computer program code and/or any hardware or circuitry utilized to provide the functionality attributed to the module. Further, the term "module" or "component" can also refer to software objects or routines that execute on the computing system. The different components, modules, engines, and services described herein may be implemented as objects or processes that execute on the computing system (e.g., as separate threads)

The CAM module can comprise: a 2D file library storing the files converted from the 3D visualization files of the component having resinous/dielectric, and metallic/conductive constituents with voids therein; at least one processor in communication with the various print heads, the conveyor, the chuck, any additional functional "heads" and the library; a non-transitory storage medium storing a set of operational instructions for execution by the at least one processor; a micromechanical inkjet print head or heads in communication with the at least one processor and with the library; and a print head (or, heads') interface circuit in communication with the 2D file library, the memory and the micromechanical inkjet print head or heads, the 2D file library configured to provide printer operation parameters specific to a functional layer; pre-processing Computer-Aided Design/Computer-Aided Manufacturing (CAD/CAM) generated information associated with the 3D component having resinous/dielectric, and metallic/conductive constituents with voids therein to be fabricated, thereby obtaining a plurality of 2D file; loading the plurality of 2D file s processed in the step of pre-processing from the component having resinous/dielectric, and metallic/conductive constituents with voids therein 3D visualization files onto the 2D file library; and using the 2D file library, instructing the at least one processor to print the predetermined layer of the component having resinous/dielectric, and metallic/conductive constituents with voids therein in a predetermined order.

The 3D visualization file representing the component having resinous/dielectric, and metallic/conductive constituents with voids therein, used for fabrication, can be, for example: an .asm, an STL, an IGES, a STEP, a Catia, a SolidWorks, a ProE, a 3D Studio, a Gerber, a Rhino file or a file comprising one or more of the foregoing; and wherein file that represents at least one, substantially 2D layer (and uploaded to the library) can be, for example, a JPEG, a GIF, a TIFF, a BMP, a PDF file, or a combination comprising one or more of the foregoing.

Figure 1B:
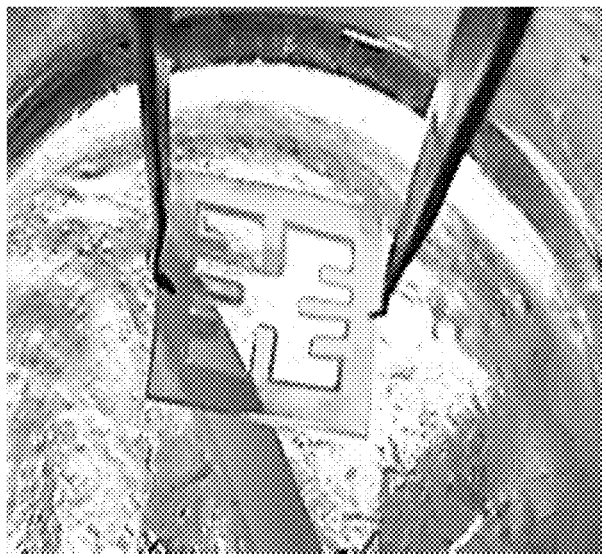

In certain exemplary implementations, the CAM module further comprises a computer program product for fabricating one or more component having resinous/dielectric, and metallic/conductive constituents with voids therein, for example, an electronic component, machine part, a USB connector, a printed circuit board (see e.g., FIG. 1A, 1B) and the like. The printed component can be, for example, a medical device, an electronic device, comprising both discrete conductive components and dielectric/resinous components that are each and both being printed optionally simultaneously or sequentially and continuously. The term "continuous" and its variants are intended to mean printing in a substantially unbroken process. In another exemplary implementation, continuous refers to a layer, member, or structure in which no significant breaks in the layer, member, or structure lie along its length.

For example, and as illustrated in FIG. 1, PCB was printed using the methods described. The whole PCB comprising the voids shown, is printed continuously using the systems described whereby pre-cured support ink composition is used and printed with the conductive ink and the DI/resinous ink composition, and subsequently removed to form the voids shown.

The computer controlling the printing process described herein can comprise: a computer readable, non-transitory storage medium with computer readable program code embodied therewith, the computer readable program code when executed by a processor in a digital computing device causes in an exemplary implementation, a three-dimensional inkjet printing unit to perform the steps of: pre-processing Computer-Aided Design/Computer-Aided Manufacturing (CAD/CAM) generated information associated with the component having resinous/dielectric, and metallic/conductive constituents with voids therein (in other words, the 3D visualization file representing the component) to be fabricated, thereby obtaining a plurality of 2D files (in other words, the file that represents at least one, substantially 2D layer for printing layer(s) of the component), each 2D file specific for a predetermined layer in a specific order; loading the plurality of 2D file(s) processed in the step of pre-processing onto a 2D file library; directing a stream of droplets of a conductive material from an inkjet print head of the three-dimensional inkjet printing unit at a surface of a substrate; directing a stream of droplets of a DI/resinous ink material from another inkjet print head of the three-dimensional inkjet printing unit at the surface of the substrate; alternatively or additionally directing a stream of droplets of a support ink composition from yet another inkjet print head of the three-dimensional inkjet printing unit at a surface; moving the first, second, and third inkjet heads relative to the substrate in an X-Y plane of the substrate on a chuck, wherein the step of moving the first, second, and third, inkjet heads relative to the substrate in the X-Y plane of the substrate, for each of a plurality of layers is performed in a layer-by-layer fabrication of the component having resinous/dielectric, and metallic/conductive constituents with voids on the substrate.

As indicated, the methods disclosed, implementable using the systems and devices provided using the executable instructions stored on non-transitory storage medium, are computerized methods utilizing processor-readable media such as various computer programs. The computer programs (software and/or firmware), can comprise program code means for carrying out the steps of the methods described herein, as well as a computer program product comprising program code means stored on a medium that can be read by a computer, such as a hard disk, CD-ROM, DVD, USB memory stick, or a storage medium that can be accessed via a data network, such as the Internet or Intranet, when the computer program product is loaded in the main memory of a computer and is carried out by the computer.

Thus, the terms "non-transitory storage medium" and "non-transitory computer-readable storage medium" are defined as including, but not necessarily being limited to, any media that can contain, store, or maintain programs, information, and data. Non-transitory storage medium and non-transitory computer-readable storage medium may include any one of many physical media such as, for example, electronic, magnetic, optical, electromagnetic, or semiconductor media. More specific examples of suitable non-transitory storage medium and non-transitory computer-readable storage medium include, but are not limited to, a magnetic computer diskette such as hard drives, magnetic tape, a random access memory (RAM), a read-only memory (ROM), solid state drive (SSD), serial AT Attachment (SATA), an erasable programmable read-only memory (EPROM), a flash drive, a compact disc (CD), or a digital video disk (DVD).

In addition, the non-transitory storage medium may be located in a first computer in which the programs are executed (e.g., the 3D inkjet printer provided), and/or may be located in a second different computer which is in communication with the first computer over a network, such as the Internet. In the latter instance, the second computer may further provide program instructions to the first computer for execution. The term "memory device" can also include two or more memory devices which may reside in different locations, e.g., in different computers that are connected over a network. Accordingly, for example, the bitmap library can reside on a memory device that is remote from the CAM module coupled to the 3D inkjet printer provided, and be accessible by the 3D inkjet printer provided (for example, by a wide area network).

Unless specifically stated otherwise, as apparent from the following discussions, it is appreciated that throughout the specification discussions utilizing terms such as "processing," "obtaining", "using", "printing", "forming", "loading," "in communication," "detecting," "calculating," "determining", "analyzing," or the like, refer to the action and/or processes of a computer or computing system, or similar electronic computing device, that manipulate and/or transform data represented as physical, such as a transistor architecture into other data similarly represented as physical structural (in other words, resin or metal/conductive) layers.

Furthermore, as used herein, the term "2D file library" refers to a given set of files that together define a single AME component having resinous/dielectric, and metallic/conductive constituents with voids therein, or a plurality of components having resinous/dielectric, and metallic/conductive constituents with voids therein, each used for a given purpose. The term can also be used to refer to a set of 2D files or any other raster graphic file format (the representation of images as a collection of pixels, generally in the form of a rectangular grid, e.g., BMP, PNG, TIFF, GIF), capable of being indexed, searched, and reassembled to provide the structural layers of a given component, —whether the search is for the component, or a given specific layer.

The Computer-Aided Design/Computer-Aided Manufacturing (CAD/CAM) generated information associated with the component having resinous/dielectric, and metallic/conductive constituents with voids therein to be fabricated used in the methods, programs and libraries for using inkjet printing based on converted CAD/CAM data packages can be, for example at least one of: IGES, DXF, DMIS, NC files, GERBER® files, EXCELLON®, STL, EPRT files, an .asm, a STEP, a Catia, a SolidWorks, a ProE, a 3D Studio, a Rhino file and a 3D file package comprising one or more of the foregoing. Additionally, attributes attached to the graphics objects transfer the meta-information (meta data) needed for fabrication and can precisely define the printing order, image (in other words, patterns) and the structure of the image (e.g., resin, support, or metal), resulting in an efficient and effective transfer of fabrication data from design (3D visualization CAD e.g.) to fabrication (2D layer file library for the CAM e.g.). Accordingly and in an exemplary implementation, using pre-processing algorithm, GERBER®, EXCELLON®, DWG, DXF, STL, EPRT ASM, and the like as described herein, are converted to 2D files.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

All ranges disclosed herein are inclusive of the endpoints, and the endpoints are independently combinable with each other. "Combination" is inclusive of blends, mixtures, alloys, reaction products, and the like. The terms "a", "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the constituent(s) includes one or more constituent). Reference throughout the specification to "one exemplary implementation", "another exemplary implementation", "an exemplary implementation", and so forth, when present, means that a particular element (e.g., feature, structure, and/or characteristic) described in connection with the exemplary implementation is included in at least one exemplary implementation described herein, and may or may not be present in other exemplary implementations. In addition, it is to be understood that the described elements may be combined in any suitable manner in the various exemplary implementations.

All ranges disclosed herein are inclusive of the endpoints, and the endpoints are independently combinable with each other. Furthermore, the terms "first," "second," "third", and the like, herein do not denote any order, quantity, or importance, but rather are used to denote one element from another.

Likewise, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

Accordingly, provided herein is a pre-cured support ink composition comprising: at least one of: an acrylate polymer, oligomer and derivatives thereof, wherein the at least one of acrylate derivatives thereof are each pre-cured; a pre-cured water-soluble copolymer comprising a backbone having aromatic and aliphatic monomers; a surfactant; a photoinitiator (PI), wherein the ratio (w/w) between the water-soluble copolymer and the PI is between 1:1 and 4:1, wherein (i) the support ink is at least one of: a suspension, an emulsion, and a solution, (ii) comprising between about 50% (w/w) and 90% (w/w) of the pre-cured at least one of acrylate monomer and derivatives thereof; between about 10% (w/w) and 20% (w/w) of the copolymer; between about 5% (w/w) and 10% (w/w) of the PI; and no more than 1% (w/w) of the surfactant, wherein the surfactant does not activate cross linking, wherein (iii) the copolymer backbone has a weight average molecular weight ($\overline{M_W}$), of between about 5,000 and about 15,000, (iv) the acrylate polymer and/or oligomer is composed of polymerized monomeric units that are at least one of: an ethylenically unsaturated monocarboxylic acid containing from 3 to 12 carbon atoms per molecule, an ethylenically unsaturated dicarboxylic acid containing from 4 to 12 carbon atoms per molecule, the alkali metal and ammonium salts of the monocarboxylic acid and the dicarboxylic acid, the anhydrides of the cis dicarboxylic acids, and a copolymer thereof, (v) the acrylate polymer's monomeric unit is at least one of: ethyl acrylate, 2-ethylhexyl-acrylate, butyl-acrylate, acryloyl-morpholine (ACMO) and copolymers thereof, (vi) the pre-cured acrylate polymer backbone having a weight average molecular weight ($\overline{M_W}$), of between about 1,000 and about 20,000, wherein (vii) the pre-cured water soluble copolymer comprising a backbone having aromatic and aliphatic monomers is at least one of: poly(vinylpyrrolidone) (PVP), N-vinyl-2-pyrrolidone (VP), poly(ethyleneglycol) (PEG), and poly(vinylalcohol) (PVA), wherein (viii) wherein the PI is at least one of: Isopropylthioxanthone (ITX), 2,4-Diethylthioxanthone (DETX), benzophenone, 4-methylbenzophenone, ethyl-4-dimethylaminobenzoate (EDAB), and 2,2-Dimethoxy-2-phenylacetophenone, and (ix) the surfactant configured to inhibit crosslinking is polyether-modified poly(dimethylsiloxane) (PDMS).

In another exemplary implementation, provided herein is a method for fabricating a three dimensional additive manufactured electronics (AME) comprising voids using inkjet printer comprising: providing an ink jet printing system comprising: a first print head, operable to dispense a dielectric resin composition; a second print head operable to dispense a conductive ink composition; a third print head operable to dispense a support ink composition, wherein the support ink composition comprises at least one of: an acrylate polymer, oligomer, and derivatives thereof, wherein the at least one of the: acrylate polymer, oligomer, derivatives thereof are each pre-cured; a pre-cured water-soluble copolymer comprising a backbone having aromatic and aliphatic monomers; a surfactant adapted to inhibit crosslinking of the pre-cured acrylate oligomers and/or derivatives thereof and the water-soluble copolymer; a photoinitiator (PI), wherein the ratio (w/w) between the water-soluble copolymer and the PI is between 1:1 and 4:1; a conveyor, operably coupled to the first, the second and the third print heads configured to convey a substrate to each of the first, second, and third print heads; and a computer aided manufacturing ("CAM") module, in communication with each of the first, and second print heads, the CAM further comprising a central processing module (CPM) including at least one processor, in communication with a non-transitory computer readable storage device configured to store instructions that, when executed by the at least one processor cause the CAM to control the ink-jet printing system, by carrying out steps that comprise: receiving a 3D visualization file representing the AME circuit comprising the voids; and generating a file library having a plurality of files, each file representing a substantially 2D layer for printing the AME circuit comprising the voids and the substantial 2D layer printing order, wherein each layer comprises a dielectric ink pattern, a conductive ink pattern, and a support ink pattern on the same layer file and wherein the CAM module is configured to control each of the first, second and third print heads; providing the dielectric resin composition, the conductive ink composition and the support ink composition; using the CAM module, obtaining from the library the first layer file; using the first print head, forming the pattern corresponding to the dielectric resin on the substrate; using actinic radiation, curing the pattern corresponding to the dielectric resin representation; using the second print head, forming the pattern corresponding to the conductive ink representation; using at least one of: heat, and pressure, sintering the pattern corresponding to the conductive ink; before, or subsequent to at least one of: the step of forming and curing the pattern corresponding to the dielectric resin representation, and the step of forming and sintering pattern corresponding to the conductive ink representation using the third print head, forming the pattern corresponding to the support ink representation; using actinic radiation, curing the pattern corresponding to the support ink composition in the first 2D layer of the component comprising the voids; using the CAM module, obtaining from the library a subsequent layer file; using the first print head, forming the pattern corresponding to the dielectric resin in the subsequent layer file; repeating the steps of curing the pattern corresponding to the dielectric resin representation, to the step of obtaining from the library a subsequent layer file, to the completion of the printing of the substantially 2D layer files in the library; and removing the substrate, thereby fabricating the AME comprising the voids (after dissolution of the support ink), the method further comprising (x) immersing the AME comprising the voids in double distilled water (DDW), or deuterium-depleted water; and dissolving the support ink in the DDW, thereby forming the voids (in other words, the areas corresponding to the support ink location following the printing of all the files in the library), wherein (xi) the step of curing at least one of: the dielectric resin, and the support ink in the first layer (whether on the substrate, the CI pattern, or the DI pattern) comprises heating, photopolymerizing, drying, depositing plasma, cross linking, annealing, facilitating redox reaction, entangling, or a combination comprising one or more of the foregoing, wherein (xii) the support ink composition is configured to have a melting temperature of between about 180° C. and about 220° C., while (xiii) the water temperature in the step of dissolving the support is between about 23° and about 70° C., wherein (xiv) the support ink composition comprises: between about 50% (w/w) and 90% (w/w) of the pre-cured at least one of acrylate polymer, oligomer and derivatives thereof; between about 10% (w/w) and 20% (w/w) of the water-soluble copolymer; between about 5% (w/w) and 10% (w/w) of the PI; and no more than 1% (w/w) of the surfactant, wherein the surfactant does not activate cross linking, wherein (xv) the pre-cured water-soluble copolymer backbone has a weight average molecular weight ($\overline{M_W}$), of between about 5,000 and about 15,000, (xvi) the pre-cured acrylate polymer backbone or the pre-cured derivative thereof has a weight average molecular weight ($\overline{M_W}$), of between about 1,000 and about 20,000, wherein (xvii) the acrylate polymer, oligomer or their derivative is a composition of polymerized monomeric units that are at least one of: an ethylenically unsaturated monocarboxylic acid containing from 3 to 12 carbon atoms per molecule, an ethylenically unsaturated dicarboxylic acid containing from 4 to 12 carbon atoms per molecule, the ammonium salts of the monocarboxylic acid and the dicarboxylic acid, the anhydrides of the cis dicarboxylic acids, and a copolymer thereof, for example, at least one of ethyl acrylate, 2-ethylhexyl-acrylate, butyl-acrylate, acryloyl-morpholine (ACMO) and copolymers thereof, and wherein (xviii) the water soluble copolymer is at least one of: poly(vinylpyrrolidone) (PVP), N-vinyl-2-pyrrolidone (VP), poly(ethyleneglycol) (PEG), poly(vinylalcohol) (PVA), and a copolymer comprising one or more of the foregoing.

Although the foregoing disclosure for 3D printing of component having resinous/dielectric, and metallic/conductive constituents with voids therein using additive manufacturing based on converted 3D visualization CAD/CAM data packages has been described in terms of some exemplary implementations, other exemplary implementations will be apparent to those of ordinary skill in the art from the disclosure herein. Moreover, the described exemplary implementations have been presented by way of example only, and are not intended to limit the scope of the inventions. Indeed, the novel methods, programs, libraries and systems described herein may be embodied in a variety of other forms without departing from the spirit thereof. Accordingly, other combinations, omissions, substitutions and modifications will be apparent to the skilled artisan in view of the disclosure herein.

What is claimed:

1. A pre-cured support ink composition comprising:
at least one of: an acrylate polymer, oligomer and derivatives thereof, wherein the at least one of acrylate derivatives thereof are each pre-cured;
at least one of: a pre-cured water-soluble copolymer comprising a backbone having aromatic and aliphatic monomers, and/or comprising of two or more polymers having a backbone comprising aromatic or aliphatic monomers;
a surfactant;
a photoinitiator (PI), wherein the ratio (w/w) between the water-soluble copolymer and the PI is between 1:1 and 4:1.

2. The composition of claim 1, wherein the support ink is at least one of: a suspension, an emulsion, and a solution.

3. The composition of claim 1, comprising
between about 50% (w/w) and 90% (w/w) of the pre-cured at least one of acrylate monomer and derivatives thereof;
between about 10% (w/w) and 20% (w/w) of the water-soluble copolymer;
between about 5% (w/w) and 10% (w/w) of the PI; and
no more than 1% (w/w) of the surfactant, wherein the surfactant does not activate cross linking.

4. The composition of claim 2, wherein the water-soluble copolymer backbone has a weight average molecular weight ($\overline{M_W}$), of between about 5,000 and about 15,000.

5. The composition of claim 4, wherein the acrylate polymer and/or oligomer is composed of polymerized monomeric units that are at least one of: an ethylenically unsaturated monocarboxylic acid containing from 3 to 12 carbon atoms per molecule, an ethylenically unsaturated dicarboxylic acid containing from 4 to 12 carbon atoms per molecule, the alkali metal and ammonium salts of the monocarboxylic acid and the dicarboxylic acid, the anhydrides of the cis dicarboxylic acids, and a copolymer thereof.

6. The composition of claim 5, wherein the acrylate polymer's monomeric unit is at least one of: ethyl acrylate, 2-ethylhexyl-acrylate, butyl-acrylate, and acryloyl-morpholine (ACMO).

7. The composition of claim 5, wherein the pre-cured acrylate polymer backbone has a weight average molecular weight ($\overline{M_W}$), of between about 1,000 and about 20,000.

8. The composition of claim 6, wherein the water-soluble copolymer comprising two or more polymers having a backbone comprising aromatic or aliphatic monomers is at least two of: poly(vinylpyrrolidone) (PVP), N-vinyl-2-pyrrolidone (VP), poly(ethyleneglycol) (PEG), and poly(vinylalcohol) (PVA).

9. The composition of claim 2, wherein the PI is at least one of: Isopropylthioxanthone (ITX), 2,4-Diethylthioxanthone (DETX), benzophenone, 4-methylbenzophenone, ethyl-4-dimethylaminobenzoate (EDAB), and 2,2-Dimethoxy-2-phenylacetophenone.

10. The composition of claim 9, wherein the surfactant is polyether-modified poly(dimethylsiloxane) (PDMS).

11. A method for fabricating a three dimensional additive manufactured electronics (AME) comprising voids using inkjet printer comprising:
providing an ink jet printing system comprising:
a first print head, operable to dispense a dielectric resin composition;
a second print head operable to dispense a conductive ink composition;
a third print head operable to dispense a support ink composition, wherein the support ink composition comprises at least one of: an acrylate polymer, oligomer, and derivatives thereof, wherein the at least one of the: acrylate polymer, oligomer, derivatives thereof are each pre-cured; at least one of: a pre-cured water-soluble copolymer comprising a backbone having aromatic and aliphatic monomers, and/or comprising two or more polymers having a backbone comprising aromatic or aliphatic monomers; a surfactant adapted to inhibit cross-linking of the pre-cured acrylate oligomers and/or derivatives thereof and the water-soluble copolymer; a photoinitiator (PI), wherein the ratio (w/w) between the water-soluble copolymer and the PI is between 1:1 and 4:1;
a conveyor, operably coupled to the first, the second and the third print heads configured to convey a substrate to each of the first, second, and third print heads; and
a computer aided manufacturing ("CAM") module, in communication with each of the first, and second print heads, the CAM further comprising a central processing module (CPM) including at least one processor, in communication with a non-transitory computer readable storage device configured to store instructions that, when executed by the at least one processor cause the CAM to control the ink-jet printing system, by carrying out steps that comprise:
receiving a 3D visualization file representing the AME circuit comprising the voids; and generating a file library having a plurality of files, each file representing a substantially 2D layer for printing the AME circuit comprising the voids and the substantial 2D layer printing order, wherein each layer comprises a dielectric ink pattern, a conductive ink pattern, and a support ink pattern on the same layer file and wherein the CAM module is configured to control each of the first, second and third print heads;
providing the dielectric resin composition, the conductive ink composition and the support ink composition;
using the CAM module, obtaining from the library the first layer file;
using the first print head, forming the pattern corresponding to the dielectric resin on the substrate;
using actinic radiation, curing the pattern corresponding to the dielectric resin representation;
using the second print head, forming the pattern corresponding to the conductive ink representation;
using at least one of: heat, and pressure, sintering the pattern corresponding to the conductive ink;
before, or subsequent to at least one of: the step of forming and curing the pattern corresponding to the dielectric resin representation, and the step of forming and sintering pattern corresponding to the conductive ink representation using the third print head, forming the pattern corresponding to the support ink representation;
using actinic radiation, curing the pattern corresponding to the support ink composition in the first 2D layer of the component comprising the voids;
using the CAM module, obtaining from the library a subsequent layer file;
using the first print head, forming the pattern corresponding to the dielectric resin in the subsequent layer file;
repeating the steps of curing the pattern corresponding to the dielectric resin representation, to the step of obtaining from the library a subsequent layer file, to the completion of the printing of the substantially 2D layer files in the library; and
removing the substrate, thereby fabricating the AME comprising the voids.

12. The method of claim 11, further comprising
immersing the AME comprising the voids in double distilled water (DDW); and
dissolving the support ink in the DDW, thereby forming the voids.

13. The method of claim 11, wherein the step of curing at least one of: the dielectric resin, and the support ink in the first layer comprises heating, photopolymerizing, drying, depositing plasma, cross linking, annealing, facilitating redox reaction, entangling, or a combination comprising one or more of the foregoing.

14. The method of claim 11, wherein the support ink composition is configured to have a melting temperature of between about 180° C. and about 220° C.

15. The method of claim 12, wherein the water temperature in the step of dissolving the support is between about 23° and about 70° C.

16. The method of claim 11, wherein the support ink composition comprises:
between about 50% (w/w) and 90% (w/w) of the pre-cured at least one of acrylate polymer, oligomer and derivatives thereof;
between about 10% (w/w) and 20% (w/w) of the pre-cured water-soluble copolymer;
between about 5% (w/w) and 10% (w/w) of the PI; and
no more than 1% (w/w) of the surfactant, wherein the surfactant does not activate cross linking.

17. The method of claim 16, wherein the pre-cured water-soluble copolymer backbone has a weight average molecular weight ($\overline{M_W}$), of between about 5,000 and about 15,000.

18. The method of claim 16, the pre-cured acrylate polymer backbone or the pre-cured derivative thereof has a weight average molecular weight ($\overline{M_W}$), of between about 1,000 and about 20,000.

19. The method of claim 18, wherein the acrylate polymer, oligomer or their derivative is a composition of polymerized monomeric units that are at least one of: an ethylenically unsaturated monocarboxylic acid containing from 3 to 12 carbon atoms per molecule, an ethylenically unsaturated dicarboxylic acid containing from 4 to 12 carbon atoms per molecule, the ammonium salts of the monocarboxylic acid and the dicarboxylic acid, the anhydrides of the cis dicarboxylic acids, and a copolymer thereof.

20. The method of claim 17, wherein the pre-cured water-soluble copolymer comprising two or more polymers having a backbone comprising aromatic or aliphatic monomers is at least two of: poly(vinylpyrrolidone) (PVP), N-vinyl-2-pyrrolidone (VP), poly(ethyleneglycol) (PEG), and poly(vinylalcohol) (PVA).

* * * * *